United States Patent
Zhu et al.

(10) Patent No.: US 11,164,059 B2
(45) Date of Patent: Nov. 2, 2021

(54) TWO-DIMENSIONAL CODE IMAGE GENERATION METHOD AND APPARATUS, STORAGE MEDIUM AND ELECTRONIC DEVICE

(71) Applicant: BOE TECHNOLOGY GROUP CO., LTD., Beijing (CN)

(72) Inventors: Dan Zhu, Beijing (CN); Pablo Navarrete Michelini, Beijing (CN); Lijie Zhang, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/835,809

(22) Filed: Mar. 31, 2020

(65) Prior Publication Data
US 2020/0226440 A1    Jul. 16, 2020

Related U.S. Application Data (63) Continuation of application No. PCT/CN2019/110093, filed on Oct. 9, 2019.

(30) Foreign Application Priority Data

Oct. 17, 2018    (CN) .......................... 201811210042.2

(51) Int. Cl.
*G06K 19/00* (2006.01)
*G06K 19/06* (2006.01)
*G06T 5/50* (2006.01)

(52) U.S. Cl.
CPC . *G06K 19/06103* (2013.01); *G06K 19/06037* (2013.01); *G06T 5/50* (2013.01); *G06T 2207/20221* (2013.01)

(58) Field of Classification Search
CPC combination set(s) only.
See application file for complete search history.

(56) References Cited

U.S. PATENT DOCUMENTS

2006/0262328 A1* 11/2006 Nose ...................... G06K 1/121
  358/1.1
2011/0290882 A1    12/2011 Gu
(Continued)

FOREIGN PATENT DOCUMENTS

| CN | 103854298 | 6/2014 |
|---|---|---|
| CN | 104835108 | 8/2015 |

(Continued)

OTHER PUBLICATIONS

Xu et al., Stylize Aesthetic QR Code, IEEE Transactions On Multimedia, vol. 14, No. 8, Aug. 2017 (Year: 2017).*
(Continued)

*Primary Examiner* — Barbara D Reinier
(74) *Attorney, Agent, or Firm* — Calfee, Halter & Griswold LLP (57) ABSTRACT

Disclosed is a two-dimensional code image generation method and apparatus, a storage medium and an electronic device related to the field of two-dimensional code image technology. The method includes obtaining an initial two-dimensional code image and a background image, and performing structured processing on the initial two-dimensional code image according to the background image to obtain a structured two-dimensional code image, performing mode transfer processing on the background image to obtain a background image of a target mode by a mode transfer model, and performing a fusion operation on the structured two-dimensional code image and the background image of the target mode to obtain a target two-dimensional code image.

18 Claims, 6 Drawing Sheets

(56) References Cited

U.S. PATENT DOCUMENTS

2015/0324946 A1* 11/2015 Arce .................. G06T 5/004
                                                                      382/251
2020/0226440 A1    7/2020  Zhu et al.

FOREIGN PATENT DOCUMENTS

| CN | 105095939 | 11/2015 |
| --- | --- | --- |
| CN | 106778995 | 5/2017 |
| CN | 106845313 | 6/2017 |
| CN | 108073963 | 5/2018 |
| CN | 108537776 | 9/2018 |
| CN | 108596830 | 9/2018 |
| CN | 109376830 | 2/2019 |

OTHER PUBLICATIONS

Office action from Chinese Application No. 201811210042.2 dated Mar. 18, 2020.

Mingliang Xu et al., "Stylize Aesthetic QR Code", Mar. 3, 2018, 14 pgs.

Yongtai Zhang et al., "Aesthetic QR Codes Based on Two-Stage Image Blending", Institute of Computer Science and Technology, 2015, pp. 183-194.

Xun Huang et al., "Arbitrary Style Transfer in Real-time with Adaptive Instance Normalization", Jul. 30, 2017, 11 pgs.

* cited by examiner

TWO-DIMENSIONAL CODE IMAGE GENERATION METHOD AND APPARATUS, STORAGE MEDIUM AND ELECTRONIC DEVICE

CROSS REFERENCE TO RELATED APPLICATIONS

The present application is a continuation application under 35 U.S.C. 111 (a) of PCT International Application No. PCT/CN2019/110093, filed on Oct. 9, 2019, which claims the benefit of Chinese Patent Application No. 201811210042.2, filed on Oct. 17, 2018, the entire disclosures of which are incorporated herein by reference.

TECHNICAL FIELD

At least one embodiment of the disclosure relates to the field of two-dimensional code technology, and in particular, to a two-dimensional code image generation method and apparatus, a storage medium and an electronic device.

BACKGROUND

With the popularization of intelligent terminals, use of two-dimensional codes is also more prevalent. Based on the needs of personalization and aesthetics, people hope to use a two-dimensional code which fuses a background pattern and an artistic style.

SUMMARY

In view of this, at least one exemplary embodiment provides a two-dimensional code image generation method and apparatus.

The objectives of at least one exemplary embodiment are achieved by the following technical solutions.

In a first aspect, at least one exemplary embodiment provides a two-dimensional code image generation method, the method includes:

obtaining an initial two-dimensional code image and a background image, and performing structured processing on the initial two-dimensional code image according to the background image to obtain a structured two-dimensional code image, wherein the structured processing fuses an image element of the background image on the premise of retaining the basic information of the initial two-dimensional code image; performing mode transfer processing on the background image to obtain an image of a target mode by a mode transfer model for converting an input image into an image with a mode it is to be transferred to; and performing a fusion operation on the structured two-dimensional code image and the image of the target mode to obtain a target two-dimensional code image, such that the target two-dimensional code image not only has the basic information and the image element, but also has the mode.

In an exemplary embodiment, the performing structured processing on the initial two-dimensional code image according to the background image to obtain a structured two-dimensional code image includes: performing preprocessing on the background image to transform it to a corresponding scattergram which is constituted by a pixel module composed of black pixels and a pixel module composed of white pixels and of which the image size is the same as that of the initial two-dimensional code image; identifying individual functional areas of the initial two-dimensional code image, determining an area in the individual functional areas where pixel change may be made, determining the amount of change of a pixel in the area where pixel change may be made in comparison with the scattergram, and generating an intermediate two-dimensional code image after corresponding change; and fusing the intermediate two-dimensional code image with the scattergram to obtain the structured two-dimensional code image.

In an exemplary embodiment, the performing preprocessing on the background image to transform it to a corresponding scattergram includes: processing the background image into a corresponding grayscale image and dividing the grayscale image into $(n/m)^2$ pixel modules of the size m×m, the pixel module being denoted as $_{sub}G_r$, r being the index of a current pixel module and its value range being $[1, (n/m)^2]$, wherein n is the size of the initial two-dimensional code image, m is the size of a unit black/white module of a two-dimensional code image, the two-dimensional code image is constituted by multiple unit black modules and unit white modules, and performing binarization processing of $_{sub}G_r$ to obtain binarized modules, the scattergram comprises $(n/m)^2$ binarized modules, wherein $_{mod}G_r$ is a module after $_{sub}G_r$ is binarized:

$$_{mod}G_r = \text{round}\left\{\frac{\sum_{i,j} {_{sub}G_r(i,j)} \cdot G_W(i,j)}{255}\right\}$$

wherein round represents an operation of taking value to the nearest whole number, $G_W(i,j)$ is a weight of $_{sub}G_r$ at its pixel $(i,j)$, $1 \leq i, j \leq m$, $\Sigma_{i,j} G_W(i,j) = 1$, and $G_W(i,j)$ satisfies the Gaussian distribution and is defined as follows:

$$G_W(i,j) = \frac{1}{2\pi\sigma^2} e^{-\frac{i^2+j^2}{2\sigma^2}}, \sigma = \frac{m-1}{6}$$

wherein σ represents the standard deviation of the Gaussian distribution.

In an exemplary embodiment, the determining the amount of change of a pixel in the area where pixel change may be made in comparison with the scattergram, and generating the structured two-dimensional code image after corresponding change includes: fusing the binarized background image with the initial two-dimensional code image $Q^s$ to obtain an intermediate two-dimensional code image $Q^i$ by the following formula:

$$_{mod}Q_r^i = \begin{cases} _{mod}Q_r^s, & Q_r^s \in M \\ _{mod}G_r, & Q_r^s \notin M \end{cases}$$

wherein $Q^s$ is the initial two-dimensional code image, $Q^i$ is an intermediate two-dimensional code image, and M is an unchangeable part in the initial two-dimensional code image; and utilizing the following formula to obtain the structured two-dimensional code image, wherein when the value of the formula after arg min is minimal, what is obtained is a matrix of the structured two-dimensional code image, which is denoted by $S_c$:

$$\arg\min_{S_c} \sum_r \eta(r) \cdot f(_{mod}Q_r^b, {}_{mod}Q_r^i)$$

wherein $Q^b$ is the scattergram, $Q_r^b$ and $Q_r^i$ are the r-th modules with a corresponding position of the background image and the intermediate two-dimensional code image, respectively, $\eta(r)$ represents a visual weight of the r-th modules, and the definition of the function f is: $f(a,b)=2(a\odot b)-1$, wherein $\odot$ represents an inclusive OR operation, and $$\eta(r) = \sum_{i,j} \lambda_{1\,sub}E_r(i,j) + \lambda_{2\,sub}S_r(i,j)$$

wherein $\lambda_1$ and $\lambda_2$ are a weight of an edge and a weight of significance, respectively, $E_r$ is the edge, and $S_r$ is the significance.

In an exemplary embodiment, the two-dimensional code image generation method further includes:

modifying the bit value of an area in the intermediate two-dimensional code image where pixel occurs accordingly:

$$B_{L(r)} = B_{L(r)} \oplus {}_{mod}Q_r^i \oplus {}_{mod}Q_r^s$$

wherein $L(r)$ is the number of bits of the r-th module, B represents bit, $\oplus$ represents an exclusive OR operation, which outputs 1 when two variables are different and 0 when the two variables are the same.

In an exemplary embodiment, the performing a fusion operation on the structured two-dimensional code image and the image of the target mode to obtain a target two-dimensional code image includes: dividing the structured two-dimensional code image into basically square modules with a side length m, wherein each of the square modules is completely constituted by black pixels or completely constituted by white pixels; for a module constituted by black pixels, replacing it with a black circle with a diameter m/2; for a module constituted by white pixels, replacing it with a white circle with a diameter m/2; and for a part outside the circle with the diameter m/2 in the module, replacing it with pixels of the image with the target mode at a corresponding position; wherein m is the size of a unit black module or a unit white module in the initial two-dimensional code image, and the two-dimensional code image is constituted by multiple unit black modules and unit white modules.

In an exemplary embodiment, the performing mode transfer processing on the background image to obtain an image of a target mode includes: constructing the mode transfer model by a neural network algorithm; obtaining background information from the background image and obtaining target mode information from a target mode, the background information including feature information of the background image, and the target mode information containing feature information of an image with the target mode it is to be transferred to; and transforming the background image into the image of the target mode by the mode transfer model according to the background information and the target mode information.

In an exemplary embodiment, the mode transfer model includes a compilation layer, a transformation layer and a decoding layer, wherein the compilation layer is used for obtaining the background information from the background image and obtaining the target mode information from the image of the target mode, the transformation layer is used for performing normalization calculation to obtain the feature information of the image of the target mode according to the background information and the target mode information, and the decoding layer is used for outputting the image of the target mode based on the feature information of the image of the target mode.

In an exemplary embodiment, the structured processing further includes: upgrading the version of the initial two-dimensional code image.

In a second aspect, at least one exemplary embodiment provides a two-dimensional code image generation apparatus, which apparatus includes: a first processor for obtaining an initial two-dimensional code image and a background image, and performing structured processing on the initial two-dimensional code image according to the background image to obtain a structured two-dimensional code image, wherein the structured processing is to fuse an image element of the background image on the premise of retaining the basic information of the initial two-dimensional code image; a second processor for performing mode transfer processing on the background image to obtain an image of a target mode by a mode transfer model for converting an input image to an image with a mode it is to be transferred to; and a fusion processor for performing a fusion operation on the structured two-dimensional code image and the image of the target mode to obtain a target two-dimensional code image, such that the target two-dimensional code image not only has the basic information and the image element, but also has the target mode.

In an exemplary embodiment, the first processor includes: a transformation sub-processor for performing preprocessing on the background image to transform it to a corresponding scattergram which is constituted by a pixel module composed of black pixels and a pixel module composed of white pixels and of which the image size is the same as that of the initial two-dimensional code image; an structured two-dimensional code image generation sub-processor for identifying individual functional areas of the initial two-dimensional code image, determining an area in the individual functional areas where pixel change may be made, determining the amount of change of a pixel in the area where pixel change may be made in comparison with the scattergram, and generating the structured two-dimensional code image after corresponding change.

In an exemplary embodiment, the second processor includes: a construction sub-processor for constructing the mode transfer model by a neural network algorithm; an obtaining sub-processor for obtaining background information from the background image and obtaining target mode information from an image of a target mode, the background information including feature information of the background image, and the target mode information containing feature information of the image of the target mode; and a transformation sub-processor for transforming the background image into the background image of the target mode by the mode transfer model according to the background information and the target mode information.

In an exemplary embodiment, the mode transfer model includes a compilation layer, a transformation layer and a decoding layer, the compilation layer is used for obtaining the background information from the background image and obtaining the target mode information from the image of the target mode, the transformation layer is used for performing normalization calculation to obtain the feature information of the background image of the target mode according to the background information and the target mode information, and the decoding layer is used for outputting the background image of the target mode based on the feature information of the background image of the target mode.

In a third aspect, at least one exemplary embodiment provides a storage medium on which are stored multiple instructions adapted for being loaded by a processor and performing the two-dimensional code image generation method of any embodiment as described above.

In a fourth aspect, at least one exemplary embodiment of the disclosure provides an electronic device including a storage medium and a processor; and the storage medium is used for storing instructions for being loaded by the processor and performing the two-dimensional code image generation method of any embodiment as described above.

The above description is merely an overview of the technical solutions of at least one exemplary embodiment. In the following specific implementations of at least one exemplary embodiment of the disclosure will be illustrated in order that the technical means of at least one embodiment of the disclosure can be more clearly understood and thus may be embodied according to the content of the specification, and that the foregoing and other objects, features and advantages of at least one exemplary embodiment of the disclosure can be more apparent.

BRIEF DESCRIPTION OF THE DRAWINGS

Various other advantages and benefits will become apparent to the person having ordinary skills in the art by reading the following detailed description of the exemplary embodiments. The drawings are only for the purpose of showing the exemplary embodiments, and are not considered to be limiting to the disclosure. And throughout the drawings, like reference signs are used to denote like components. In the drawings.

DETAILED DESCRIPTION

In the following exemplary embodiments will be described in more detail with reference to the accompanying drawings. While the exemplary embodiments are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to the person having ordinary skills in the art.

Generally, in the procedure of generating a two-dimensional code image fused with a background pattern and an artistic style, a user will in general re-encode the two-dimensional code image and fuse it with a background, and then select a transfer model corresponding to a user's desired artistic style for performing mode transfer on the fused two-dimensional code image, thereby obtaining a two-dimensional code image fused with the background pattern and the artistic style.

Figure 1A:
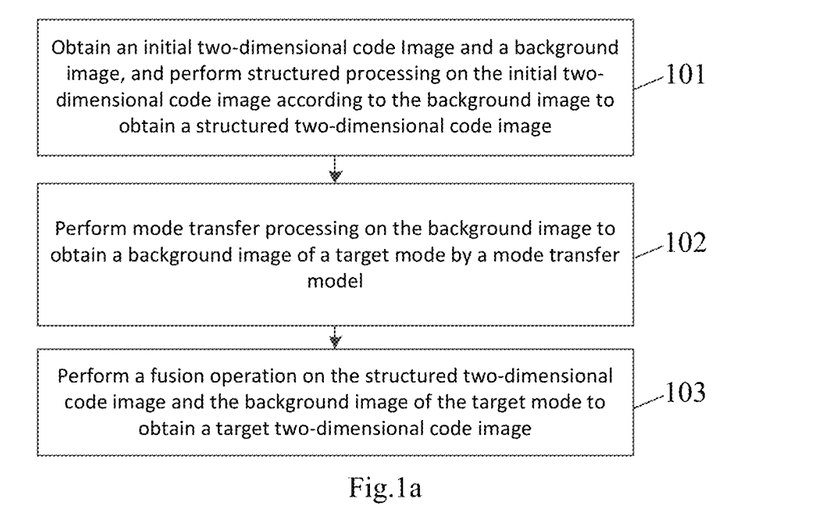
FIG. 1a shows a flow chart of a two-dimensional code image generation method provided by some exemplary embodiments.

At least one embodiment of the disclosure provides a two-dimensional code image generation method, which, as shown in FIG. 1a, mainly comprises the following steps.

At 101, an initial two-dimensional code image and a background image are obtained, and structured processing is performed on the initial two-dimensional code image according to the background image to obtain a structured two-dimensional code image, wherein the structured processing fuses an image element of the background image on the premise of retaining the basic information of the initial two-dimensional code image.

In order to be able to generate a two-dimensional code image fused with a background pattern, in at least one embodiment of the disclosure, first, it is necessary to obtain a two-dimensional code image (see image A in FIG. 3) and a background image (see image B in FIG. 3) for subsequent image fusion, that is, the initial two-dimensional code image and the background image as described in the at least one embodiment of the disclosure. Therein, the approach of obtaining the initial two-dimensional code image and the background image may be performed by selecting any of the existing approaches, for example, obtaining them via a locally or remotely accessible memory, and moreover, the obtaining approach and the selected initial two-dimensional code image and background image are not specifically limited and may be selected according to actual needs.

It should be noted that, image fusion referred to herein generally causes a fused image to simultaneously have at least partial elements of both images before fusion.

Figure 2:
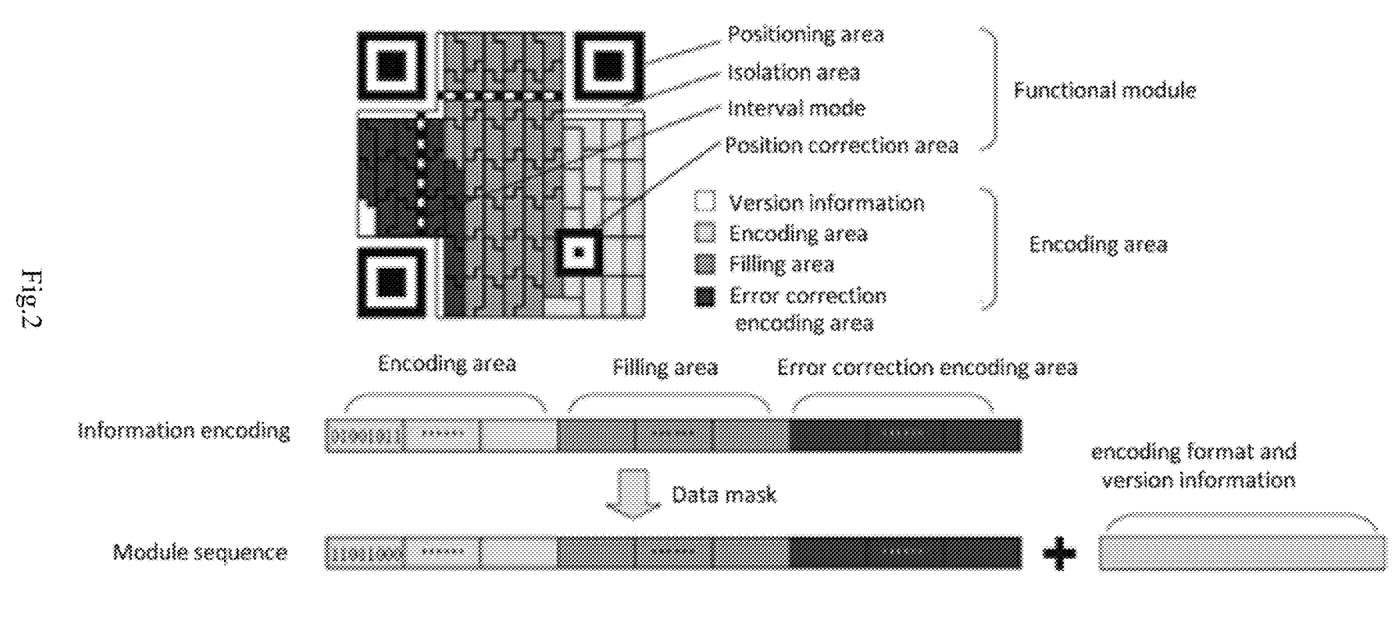
FIG. 2 shows an interface display diagram of a two-dimensional code image provided by some exemplary embodiments.

Since a two-dimensional code image is an image containing multiple pixels, its pixel distribution is determined according to the standard encoding stream and the comprised link code. Therein, as shown in FIG. 2, the structural diagram of the standard two-dimensional code image contains pixels distributed in different areas, and the meaning of pixels corresponding to each of the areas is different. In the standard two-dimensional code image, the positioning area, the isolation area, the interval mode and the position correction area are portions used for positioning and identifying the structure of the two-dimensional code image; the version information contains the version information of the two-dimensional code image; the encoding area comprises information bits of the two-dimensional code image and is a position where effective information is encoded; the error correction encoding area comprises error correction encoding bits of the two-dimensional code image, and its purpose is such that correct scanning may still be performed by error correction when there is a loss in the standard two-dimensional code image; and the filling area comprises information filling bits and does not contain any effective information, and therefore, if this part of information is missing or covered, the two-dimensional code image may still be correctly scanned.

Figure 1B:
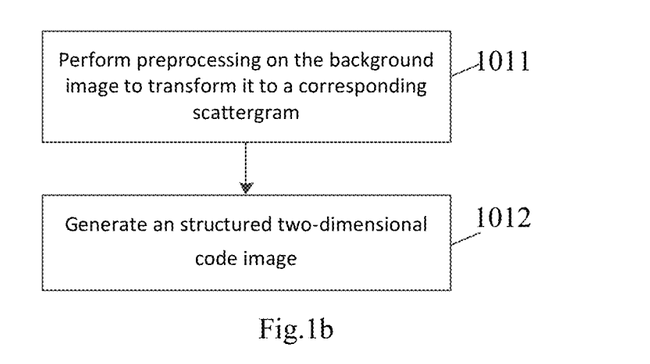
FIG. 1b shows a further flow chart of the two-dimensional code image generation method provided by some exemplary embodiments.

In at least one exemplary embodiment, in order to be able to cause the pixel distribution of the two-dimensional code image to match that of the background image, at this step, it is further necessary to perform structured processing on the initial two-dimensional code image after the initial two-dimensional code image A and the background image B are obtained. The meaning of pixels in a different area in the two-dimensional code image A is different, and as such, the approach of structured processing may be performed according to pixels representing a different meaning in the two-dimensional code image. In an example, performing structured processing on the initial two-dimensional code image A may be done as follows. As shown in FIG. 1b, at step 1011, preprocessing is performed on the background image B, the preprocessing may comprise performing scaling processing, graying processing and binarization processing (into black or white color) on the picture, the order of the scaling processing and the graying processing is not limited, and in this way, the background image B is transformed into a corresponding scattergram (not shown) which is constituted by black pixels and white pixels and of which the image size is the same as that of the initial two-dimensional code image A; at step 1012, individual functional areas of the initial two-dimensional code image A are identified, for example, the individual functional areas of the standard two-dimensional code image mentioned above such as the positioning area, the encoding area, etc., an area in the individual functional areas where pixel change may be made is determined, and the amount of change of a pixel in the area where pixel change may be made is determined in comparison with the scattergram, for example, the area where pixel change may be made comprises the error correction bit area and the filling bit area, and for example, the amount of change may be a pixel-wise, corresponding pixel difference between the scattergram and the corresponding two-dimensional code image, or also may be the average of all the corresponding pixel differences, or the like. After corresponding change, in an embodiment, further after binarization processing, a two-dimensional code image in which pixels are redistributed is obtained, which is the structured two-dimensional code image C herein and the pixel distribution of the structured two-dimensional code image corresponds to that of the scattergram.

As such, by transforming the background image into a corresponding scattergram and compiling the encoding stream of the initial two-dimensional code image based on the distribution of pixels in the scattergram, it may be ensured that the pixel distribution of the obtained intermediate two-dimensional code image relatively approaches that of the scattergram, and thereby the pixel distribution of the subsequently generated target two-dimensional code image matches that of the background image, guaranteeing the aesthetic feeling of the two-dimensional code image after fusion.

In an embodiment, in order to guarantee the identification rate of the structured two-dimensional code image, when performing structuring, it may be possible to upgrade the version of the initial two-dimensional code image. For example, for a two-dimensional code image of the standard version 1 or 2, it may be upgraded to the version 3; for a two-dimensional code image of the standard version 3-5, it may be upgraded to the version 6; and for a two-dimensional code image of the standard version 6 and above, it may go up 2 levels.

In a specific example, the method described according to this step may be performed as follows in an actual operation.

After the background image B is obtained, the image is first processed into a corresponding grayscale image G and then G is divided.

In particular, it is divided into $(n/m)^2$ pixel modules of the size m×m, which are defined as $_{sub}G_r$, wherein n is the size of the initial two-dimensional code image, m is the size of a unit black module or a unit white module of the initial two-dimensional code image, that is, the size of a minimal black module or a minimal white module (to increase the visibility, a unit black module or a unit white module of a two-dimensional code image is constituted by multiple pixels, for example, m×m pixels, and the size m of the unit black module or the unit white module may be determined as needed), the initial two-dimensional code image is constituted by multiple unit black modules and unit white modules, and r is the index of a current pixel module and its value range is $[1,(n/m)^2]$. $_{mod}G_r$ is defined as a binarized module of $_{sub}G_r$, and the formula is as follows:

$$_{mod}G_r = \text{round}\left\{\frac{\sum_{i,j} {}_{sub}G_r(i,j) \cdot G_W(i,j)}{255}\right\}$$

wherein round represents an operation of taking value to the nearest whole number, $G_W(i,j)$ is a weight of $_{sub}G_r$ at its pixel $(i,j)$, $\Sigma_{i,j} G_W(i,j)=1$, $1=<i, j<=m$, and $G_W(i,j)$ satisfies the Gaussian distribution and is defined as follows:

$$G_W(i,j) = \frac{1}{2\pi\sigma^2} e^{-\frac{i^2+j^2}{2\sigma^2}}, \sigma = \frac{m-1}{6}$$

wherein σ represents the standard deviation of the Gaussian distribution.

The standard two-dimensional code image is encoded using a fixed bit stream, which is systematic encoding, and therefore, it may be possible to change the bit stream encoding rule, that is, use a variable bit stream for encoding (non-systematic encoding), such that the distribution of black and white modules of the two-dimensional code image is as consistent with the structure of the background picture as possible. After the background image is processed, the pixels in the initial two-dimensional code image are re-encoded. In particular, the binarized background image is fused with the initial two-dimensional code image $Q^s$ to obtain an intermediate two-dimensional code image $Q^i$ by the following formula:

$$_{mod}Q^i_r = \begin{cases} {}_{mod}Q^s_r, & Q^s_r \in M \\ {}_{mod}G_r, & Q^s_r \notin M \end{cases}$$

wherein M represents an unchangeable part in the initial two-dimensional code image, for example, an information code containing basic information such as the version information, the format information, the positioning information, etc. whereas an information code containing the data information, the error correction information and the filling information, etc. is changeable. Since the encoding mod value of the data information is changed, the bit value of this part must reset to guarantee the accuracy of the two-dimensional code image scanning. The change of one module is equivalent to the change of the encoding bits of the module, and therefore, for example, for a data bit, an error correction bit and a filling bit, the B value is modified by the following formula:

$$B_{L(r)} = B_{L(r)} \oplus_{mod} Q_r^i \oplus_{mod} Q_r^s$$

wherein L(r) is the number of bits of the r-th module, B represents bit, ⊕ represents an exclusive OR operation, which outputs 1 when two variables are different and 0 when the two variables are the same.

Figure 3:
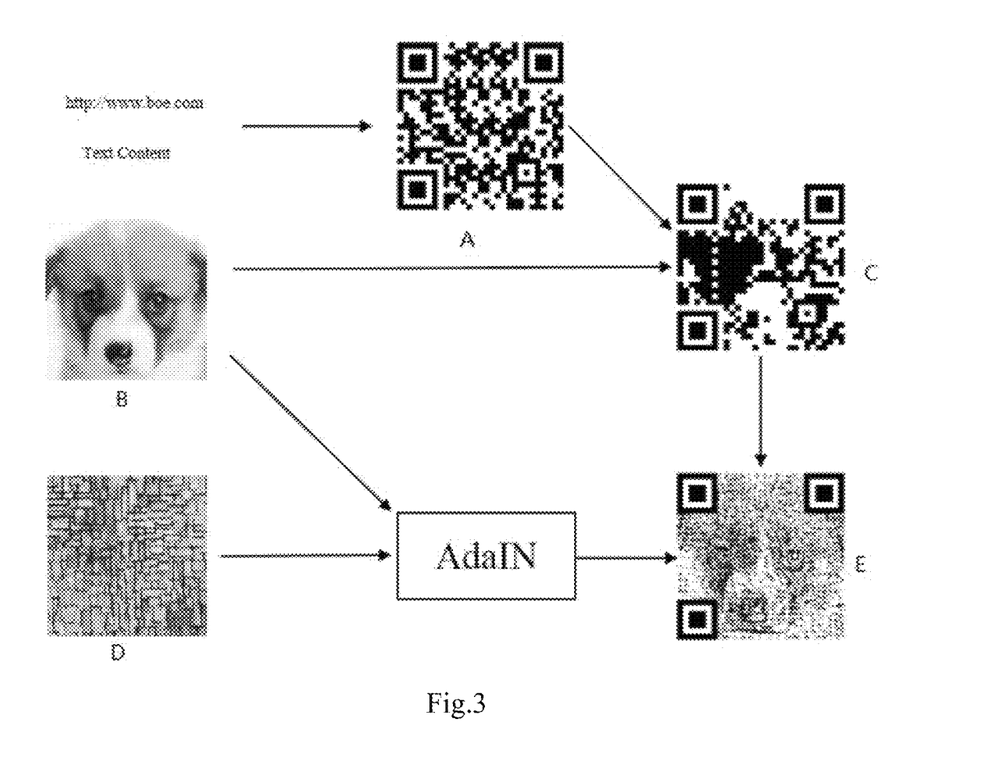
FIG. 3 shows an effect drawing in a two-dimensional code image generation procedure provided by some exemplary embodiments.

Therein, $Q^b$ is the scattergram, $Q_r^b$ and $Q_r^i$ are the r-th modules with a corresponding position of the background image and the intermediate two-dimensional code image, respectively, η(r) represents a visual weight of the r-th modules, the structured two-dimensional code image denoted by $S_c$ is obtained by using the following formula, $S_c$ is an ultimately generated matrix of the structured two-dimensional code image, and when the value of the formula after arg min is minimal, what is obtained by the formula is the matrix of the structured two-dimensional code image:

$$\arg \min_{S_c} \sum_r \eta(r) \cdot f(_{mod}Q_r^b, {}_{mod}Q_r^i)$$

wherein the definition of the function f is: f(a,b)=2(a⊙b)−1, wherein ⊙ represents an inclusive OR operation, and $$\eta(r) = \sum_{i,j} \lambda_{1\,sub} E_r(i,j) + \lambda_{2\,sub} S_r(i,j)$$

wherein $\lambda_1$ and $\lambda_2$ are a weight of an edge and a weight of significance, respectively, $E_r$ is the edge, and $S_r$ is the significance. FIG. 3 shows a structured two-dimensional code image is generated from the initial two-dimensional code image A and the background image B.

As such, at this step, by performing structured processing on the initial two-dimensional code image according to the background image, such that an image element of the background image is fused on the premise of retaining the basic information of the initial two-dimensional code image, the problem that the two-dimensional code image is inconsistent with the background pattern is solved.

At 102, mode transfer processing, that is, changing the artistic mode, for example, change of colors and textures, the mode being for example but not limited to water color mode, oil painting mode, caricature mode, etc., is performed on the background image to obtain a background image of a target mode by a mode transfer model for converting an input image to an image of the target mode, which is established based on machine learning.

In at least one exemplary embodiment, since the proceeding two-dimensional code image generation procedure further needs to perform mode transfer, to obtain a two-dimensional code image of a different mode required by a user, according to the method as described at this step, it may be possible to first select a mode transfer model and then perform mode transfer processing on the background image based on the mode transfer model.

Therein, the mode transfer model may be constructed by a convolutional neural network model. In the mode transfer model based on the convolutional neural network, it may be possible to perform feature extraction on an image of the target mode, perform feature extraction on the background image, and then according to the feature of the background image and the feature of the image of the target mode, perform calculation on the background image to be transferred by a mode transfer algorithm in the mode transfer model, to obtain an image parameter after the transfer, and obtain the corresponding transferred background image based on the image parameter, that is, the image of the target mode as described in the at least one embodiment of the disclosure.

Since at this step the mode transfer operation is only performed on the background image, and the two-dimensional code image is not involved, this avoids the influence of the existing mode transfer procedure on the pixel distribution in the two-dimensional code image and guarantees successful scanning rate of the subsequently generated target two-dimensional code image.

Figure 1C:
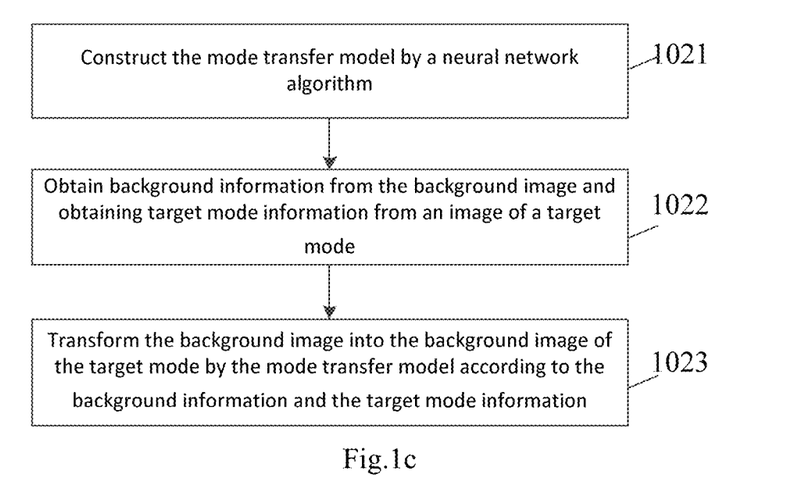
FIG. 1c shows a further flow chart of the two-dimensional code image generation method provided by some exemplary embodiments.

In an example, according to the method as described at this step, the performing mode transfer on the background image may comprise: as shown in FIG. 1c, at step 1021, constructing the mode transfer model by a neural network algorithm; then, at step 1022, obtaining background information from the background image and obtaining target mode information from an image of a target mode, the background information comprising feature information of the background image, for example, mean and variance, the target mode information containing feature information of the image of the target mode, for example, mean and variance; and finally, at step 1023, transforming the background image into the background image of the target mode by the mode transfer model according to the background information and the target mode information.

In a specific example, according to at least one exemplary embodiment, when performing mode transfer processing on the background image utilizing the mode transfer model, this may be done as follows.

Figures 4, 5:
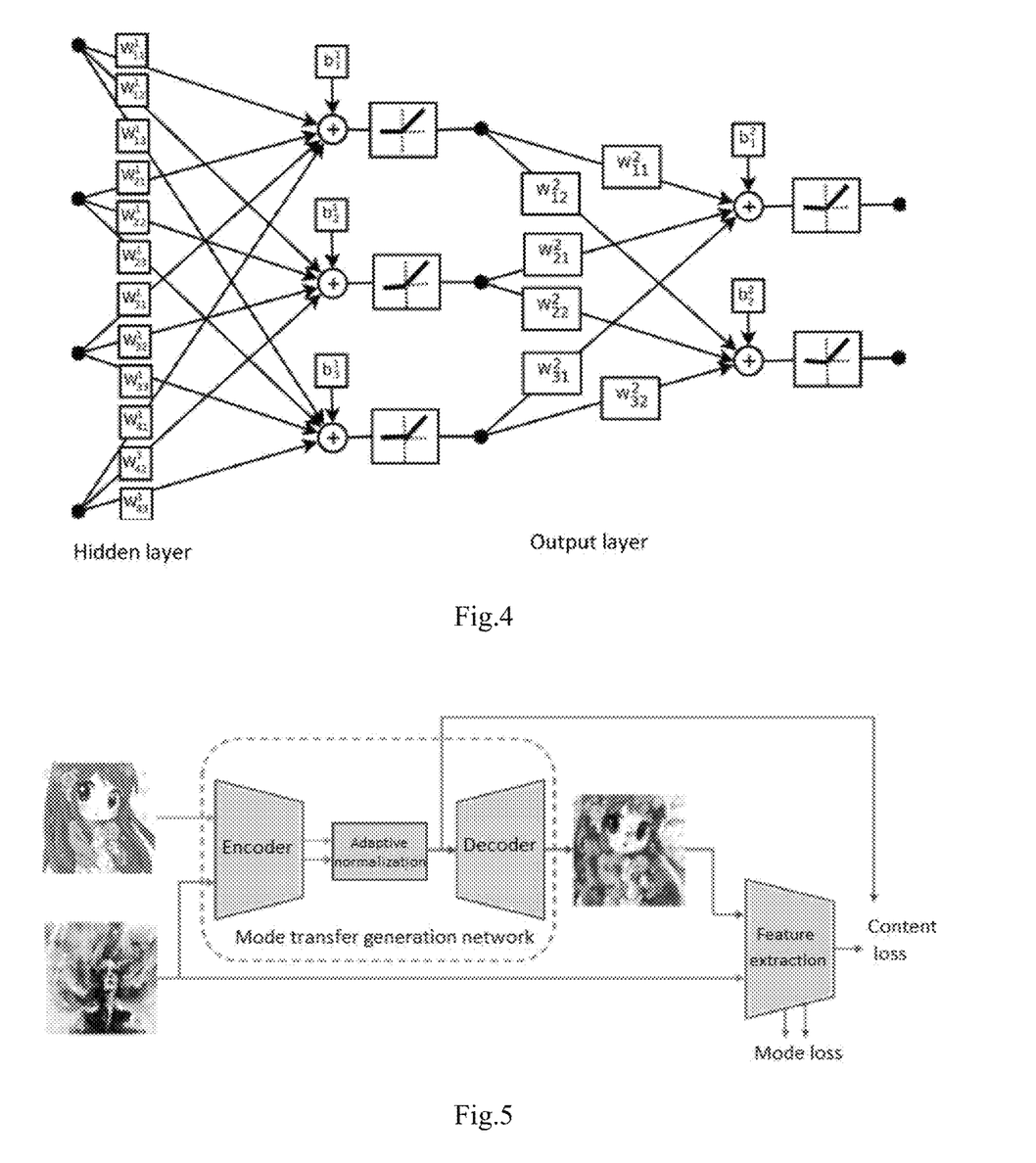
FIG. 4 shows a neural network display diagram in a two-dimensional code image generation procedure provided by some exemplary embodiments.
FIG. 5 shows a structural diagram of a mode transfer network model in a two-dimensional code image generation procedure provided by some exemplary embodiments.

First, the mode transfer model is constructed by selecting a convolutional neural network, wherein the convolutional neural network is a neural network with a special structure, and it takes images as the input and the output of the system, and replaces a scalar weight with a convolution kernel. A convolutional neural network with a three-layer structure is as shown in FIG. 4. This network has 4 inputs, the hidden layer has 3 outputs, the output layer has 2 outputs, and the system ultimately outputs two images. Each module $w_{ij}^k$ represents a convolution kernel. k represents an input layer number, and i and j represent the unit number of the input and the output. Bias $b_i^k$ is a set of scalars fused on the output of a convolutional layer. Next, the output of the convolutional layer which is fused with the bias will enter the activation layer (generally ReLU or a sigmoid function). After training, the convolution kernel and the bias of the system are fixed. The training is to perform parameter tuning on the convolution kernel and the bias by a set of matching inputs and outputs and an optimization algorithm. In general, each convolutional layer may contain tens of or hundreds of convolution kernels, and a deep neural network usually contains 5 or more layers of convolutional layers.

In a specific example, according to at least one embodiment of the disclosure, the convolutional neural network comprises a pooling layer, a BN (batch normalization) layer and an IN (instance normalization) layer.

Therein, the pooling layer is a form of down-sampling and can reduce the size of convolution features. A common pooling layer comprises max-pooling, avg-polling, decimation and demuxout.

Therein, the BN layer is used for performing standardization processing on a feature image outputted by a convolutional layer. Batch normalization is to perform standardization on each feature image according to the feature image's own mean and variance, for example. Assume that the size of mini-batch is T, the number of features outputted by a certain convolutional layer is C, and each feature image is a matrix of H rows and W columns, then the shape of the feature image is (T, C, W, H). The standardization formula of batch normalization is as follows:

$$y_{tijk} = \frac{x_{tijk} - \mu_i}{\sqrt{\sigma_i^2 + \varepsilon}},$$

$$\mu_i = \frac{1}{THW}\sum_{t=1}^{T}\sum_{l=1}^{W}\sum_{m=1}^{H} x_{tilm},$$

$$\sigma_i^2 = \frac{1}{THW}\sum_{t=1}^{T}\sum_{l=1}^{W}\sum_{m=1}^{H}(x_{tilm} - m\mu_i)^2$$

wherein $x_{tijk}$ is the value of the j-th column and the k-th row of the i-th feature image of the t-th patch in the set of feature images outputted by a convolutional layer, $y_{tijk}$ represents a result obtained by inputting $x_{tijk}$ to the batch normalization layer, and $\varepsilon$ is a very small integer to avoid that the denominator is 0.

Like the BN layer, the IN layer is also used for performing standardization processing on a feature image outputted by a convolutional layer. Assume that the size of mini-batch is T, the number of features outputted by a certain convolutional layer is C, and each feature image is a matrix of H rows and W columns, then the shape of the feature image is (T, C, W, H). The standardization formula of instance normalization is as follows:

$$y_{tijk} = \frac{x_{tijk} - \mu_{ti}}{\sqrt{\sigma_{ti}^2 + \varepsilon}},$$

$$\mu_{ti} = \frac{1}{HW}\sum_{l=1}^{W}\sum_{m=1}^{H} x_{tilm}$$

$$\sigma_{ti}^2 = \frac{1}{HW}\sum_{l=1}^{W}\sum_{m=1}^{H}(x_{tilm} - m\mu_{ti})^2$$

wherein $x_{tijk}$ is the value of the j-th column and the k-th row of the i-th feature image of the t-th patch in the set of feature images outputted by a convolutional layer, $y_{tijk}$ represents a result obtained by inputting $x_{tijk}$ to the instance normalization layer, and $\varepsilon$ is a very small integer to avoid that the denominator is 0.

FIG. 5 is a mode transfer network model for receiving a background image and an image of the target mode, and after processing, outputting an image which retains the content of the background image and contains an artistic mode. The mode transfer network is mainly composed of three parts, an encoder, a mode transfer layer and a decoder.

Figure 6:
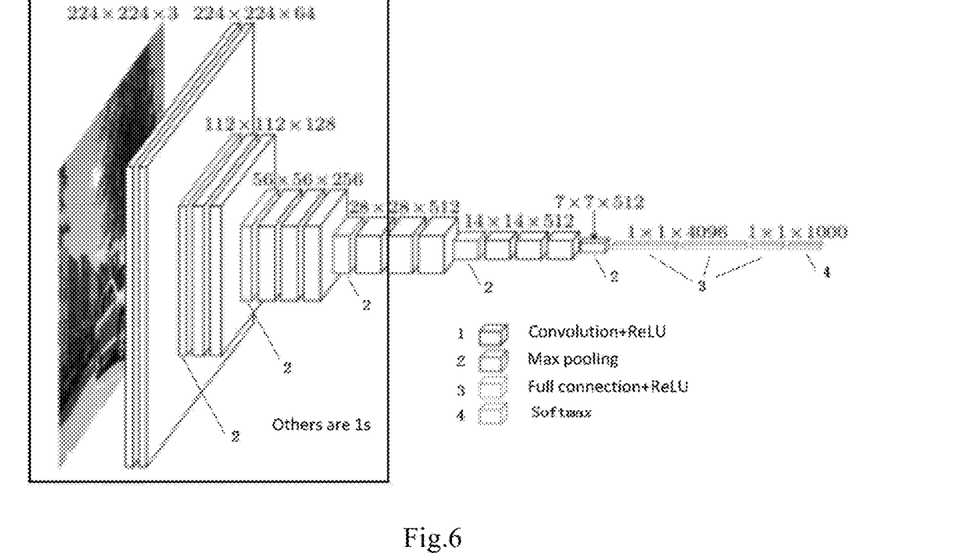
FIG. 6 shows a schematic diagram of a VGG16 network model in a two-dimensional code image generation procedure provided by some exemplary embodiments.

Therein, the encoder is configured to employ a pre-trained VGG16 network. FIG. 6 gives a general network model of VGG16, wherein an encoder according to at least one embodiment of the disclosure only uses part of it, which is specifically an area shown by the black box in FIG. 6 and transforms both the background image and the image of the target mode from an image space to a feature space, respectively.

The mode transfer layer is configured to perform normalization on the background image, and here, is to match the mean $\mu(y)$ and the variance $\sigma(y)$ of a feature of each channel of the image of the target mode by aligning with the mean $\mu(x)$ and the variance $\sigma(x)$ of the feature of each channel of the background image. Thus, in training, it may be possible to transmit a feature of the input image of the target mode to the background image, this step is the key to any mode conversion, and its mathematical expression is:

$$AdaIN(x, y) = \sigma(y)\left(\frac{x - \mu}{\sigma(x)}\right) + \mu(y).$$

The decoder is a network which transforms a feature space into an image space, this part of network generally employs a network structure symmetric with the encoder, and in the whole network what needs to be trained is the weight parameter information of this part of network. Initially, some initialization parameters may be selected randomly, and by gradient descent, parameters may be continuously updated to cause the whole loss function to be small and the network gradually converges.

In addition, in at least one exemplary embodiment, in order to guarantee the accuracy of the result of performing mode transfer on the background image and reduce content loss due to transfer, here, it is further necessary to employ a loss function to perform calculation on the image, which specifically comprises content loss and mode loss.

In an analysis network, the output of each convolutional layer is a feature of an input image. Assume that for a convolutional layer with $N_l$ convolution kernels, its output contains $N_l$ feature images, and assume that the size of each of the feature images is $M_l$ (width×height of the feature image). Thus, the output of the l-th layer may be stored in a matrix $F^l \in R^{N_l \times M_l}$. $F_{ij}^l$ represents the value of the j-th position in a feature image outputted by the i-th convolution kernel in the l-th layer. Define $\vec{p}$ and $\vec{x}$ as an original input image and a generated image, respectively, and $P^l$ and $F^l$ as feature images outputted by the l-th layer in the analysis network, respectively, then the definition of the content loss is as follows:

$$L_{content} = \frac{1}{2C1}\sum_{ij}(F_{ij}^l - P_{ij}^l)^2$$

wherein C1 is a constant for performing standardization processing on the result.

In particular, in the mode transfer, the content loss is the Euclidean distance between the content feature of the background image outputted by the encoder network and the feature output of the mode feature after the mode transfer, $$L_{content} = \frac{1}{2C1}\|f(g(t)) - f(t)\|_2,$$

wherein f(g(t)) is the feature output after mode transfer, and f(t) is the content feature outputted by the encoder.

The mode transfer is just to convey the mean and the variance of the mode feature, so the mode loss does not adopt a Gram matrix, but adopts the mean and the variance for data matching. The features of the mode feature in four layers, Relu1_1, Relu2_1, Relu3_1 and Relu4_1 are all calculated, that is, the mode loss is just a loss based on IN statistics, and the formula is as follows:

$$L_{style} = \sum_{i=1}^{L} \|\mu(f(g(t))) - \mu(f(s))\|_2 + \sum_{i=1}^{L} \|\sigma(f(g(t))) - \sigma(f(s))\|_2$$

wherein f(g(t)) is the feature output after mode transfer, and f(s) is the feature output of the image of the target mode, μ represents the mean and σ represents the variance.

The total loss of the system is defined as follows:

$$L_{total} = \alpha L_{content} + \beta L_{style}$$

wherein α, β are weights of the content loss and the mode loss in the total loss.

Further, in a specific implementation procedure, system training may further be introduced.

Figure 7:
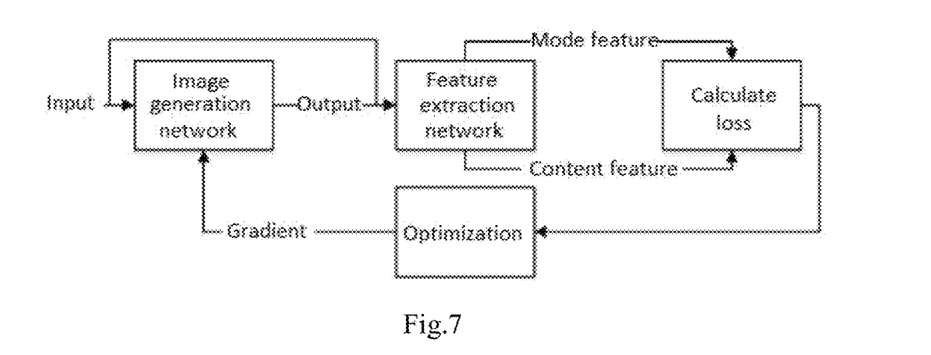
FIG. 7 shows a schematic diagram of system training in a two-dimensional code image generation procedure provided by some exemplary embodiments.

A schematic diagram of system training is as shown in FIG. 7, wherein an input image enters a generation network to generate a corresponding output image. Then, both the input image and the output image are placed into an analysis network, to obtain a respective content feature and mode feature. Here, the analysis network is VGG16, and its function is to obtain the value of a loss function, which is different from that of the encoder in the generation network. The system calculates the total loss function by features, and adjusts a parameter of the generation network by an optimizer. Thus, it may be ensured that when a different image enters the system for training, the condition of image content loss can be calculated according to the different image and the transfer mode, and then the parameter of the generation network is optimized according to a function corresponding to the loss condition. Of course, in at least one exemplary embodiment, determination of the loss function using the system training approach is just exemplary here, and may also be done according to other approaches, which will not be specifically limited here and may be selected by a user himself according to his actual needs.

As such, according to the method as described at this step, performing mode transfer on the background image by the mode transfer model as well as the background information extracted from the background image and the target mode information extracted from the image of target mode can enable the method to perform the function of mode transfer on a different background image for any one mode, thereby cause the mode transfer procedure to avoid training a different model for a different artistic style, and cause the mode transfer procedure to be simpler and more convenient.

At 103, a fusion operation is performed on the structured two-dimensional code image and the background image of the target mode to obtain a target two-dimensional code image, such that the target two-dimensional code image not only has the basic information and the image element, but also has the target mode.

After the structured two-dimensional code image is obtained after the structured processing at the above step 101 and the background image of the target mode is obtained after the mode transfer processing at the above step 102, it may be possible to, according to the method as described at this step, perform a fusion operation on the two images, and then obtain a target two-dimensional code image into which the background image of the target mode and the structured two-dimensional code image are fused.

After the structured two-dimensional code image and the background image of the target mode are obtained, the two may be fused, thereby obtaining the target two-dimensional code image as described in the at least one exemplary embodiment. Therein, in an embodiment, the image of the target mode is scaled to the structured two-dimensional code image. The structured two-dimensional code is divided into basically square modules with a side length m, wherein each of the square modules is completely constituted by black pixels or completely constituted by white pixels; for modules completely constituted by black pixels, they are replaced with black circles with a diameter m/2; for modules completely constituted by white pixels, they are replaced with white circles with a diameter m/2, for example, they are uniformly arranged at the centers of the square modules; and for parts outside the circles with the diameter m/2 in the module, they are replaced with pixels of the image of the target mode, at corresponding positions to obtain target two-dimensional code image; wherein, as mentioned above, m is the size of a unit black module or a unit white module in the initial two-dimensional code, and the two-dimensional code is constituted by multiple unit black modules and unit white modules.

In at least one exemplary embodiment, the approach of fusion operation will not be specifically limited here. For example, it may be possible to compare pixels at the same position in the two images, retain all the black pixels of the structured two-dimensional code image, and for the remaining pixels, employ pixels of the image of the target mode for corresponding filling. For another example, the above fusion approach of the structured two-dimensional code image and the background image of the target mode may be adopted, and of course, the at least one exemplary embodiment is not limited thereto, and adapted for any fusion method of images which may facilitate identification of a target two-dimensional code image and simultaneously has a target mode.

The two-dimensional code image generation method provided by the at least one exemplary embodiment may be targeted to the problem of a low identification rate of a two-dimensional code image into which a background pattern and an artistic mode are fused. Embodiments of the disclosure can obtain a structured two-dimensional code image by obtaining an initial two-dimensional code image and a background image and performing structured processing on the initial two-dimensional code image according to the background image, then perform mode transfer processing on the background image to obtain a background image of a target mode by a mode transfer model, and finally, perform a fusion operation on the structured two-dimensional code image and the background image of the target mode to obtain a target two-dimensional code image. As compared to the reference, the at least one embodiment of the disclosure performs mode transfer processing only on the background image, which can avoid interference with pixels of the two-dimensional code image and thereby improve the identification rate of the subsequently generated target two-dimensional code image. Moreover, performing structured processing on the initial two-dimensional code image according to the background image may cause the pixel distribution of the subsequently generated target two-dimensional code image to more approach that of the background image, thereby causing the target two-dimensional code image to be better fused with the background image and causing the generated two-dimensional code image to be more beautiful.

Figure 8:
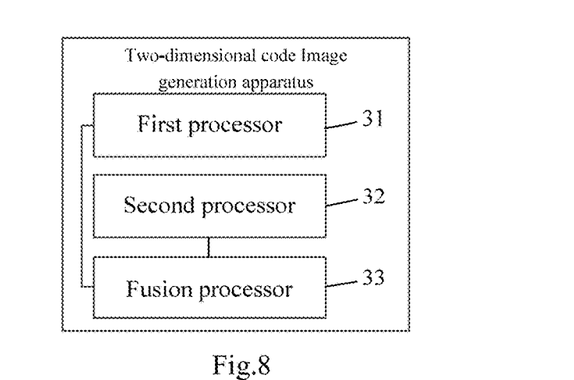
FIG. 8 shows a compositional block diagram of a two-dimensional code image generation apparatus provided by some exemplary embodiments.

Accordingly, another embodiment of the at least one exemplary embodiment further provides a two-dimensional code image generation apparatus, and as shown in FIG. 8, the apparatus mainly comprises:

a first processor 31 which is configured to perform the step 101, for example, may be used for obtaining an initial two-dimensional code image and a background image, and performing structured processing on the initial two-dimensional code image according to the background image to obtain a structured two-dimensional code image, wherein the structured processing is to fuse an image element of the background image on the premise of retaining the basic information of the initial two-dimensional code image;

a second processor 32 which is configured to perform the step 102, for example, may be used for performing mode transfer processing on the background image to obtain a background image of a target mode by a mode transfer model for converting an input image to an image of the target mode, which is established based on machine learning; and a fusion processor 33 which is configured to perform the step 103, for example, may be used for performing a fusion operation on the structured two-dimensional code image obtained by the first processor 31 and the background image of the target mode obtained by the second processor 32 to obtain a target two-dimensional code image, such that the target two-dimensional code image not only has the basic information and the image element, but also has the target mode.

Figure 9:
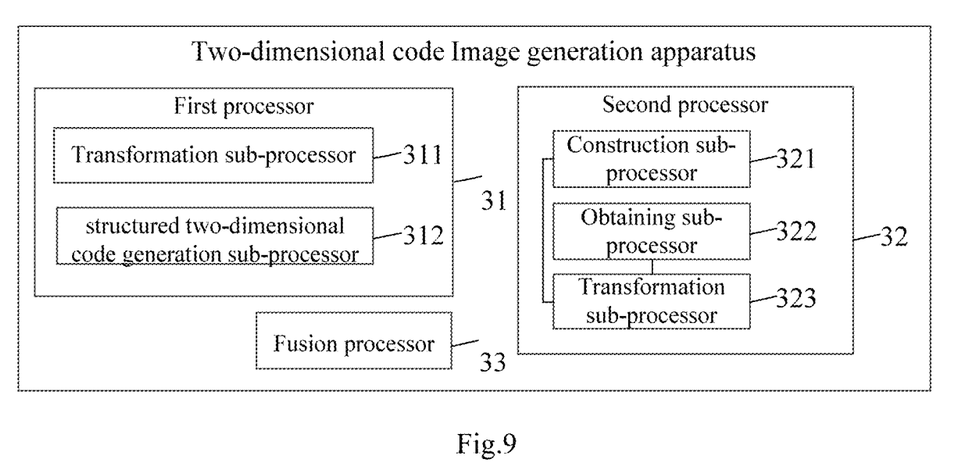
FIG. 9 shows a compositional block diagram of another two-dimensional code image generation apparatus provided by some exemplary embodiments.

In an exemplary embodiment, as shown in FIG. 9, the first processor 31 comprises:

a transformation sub-processor 311 which is configured to perform the step 1011, for example, may be used for performing preprocessing on the background image to transform it to a corresponding scattergram which is constituted by a pixel module composed of black pixels and a pixel module composed of white pixels and of which the image size is the same as that of the initial two-dimensional code image;

an structured two-dimensional code image generation sub-processor 312 which is configured to perform the step 1012, for example, may be used for identifying individual functional areas of the initial two-dimensional code image, determining an area in the individual functional areas where pixel change may be made, determining the amount of change of a pixel in the area where pixel change may be made in comparison with the scattergram, and generating the structured two-dimensional code image after corresponding change.

In an exemplary embodiment, as shown in FIG. 9, the second processor 32 comprises:

a construction sub-processor 321 which is configured to perform the step 1021, for example, may be used for constructing the mode transfer model by a neural network algorithm;

an obtaining sub-processor 322 which is configured to perform the step 1022, for example, may be used for obtaining background information from the background image and obtaining target mode information from an image of a target mode, the background information comprising feature information of the background image, and the target mode information containing feature information of the image of the target mode; and a transformation sub-processor 323 which is configured to perform the step 1023, for example, may be used for transforming the background image into the background image of the target mode by the mode transfer model constructed by the construction sub-processor 321 according to the background information and the target mode information obtained by the obtaining sub-processor 322.

The mode transfer model comprises a compilation layer, a transformation layer and a decoding layer, the compilation layer is used for obtaining the background information from the background image and obtaining the target mode information from the image of the target mode, the transformation layer is used for performing normalization calculation to obtain the feature information of the target two-dimensional code image according to the background information and the target mode information, and the decoding layer is used for outputting the target two-dimensional code image based on the feature information of the target two-dimensional code image.

By virtue of the scheme as described in the above embodiments, at least one exemplary embodiment provides a two-dimensional code image generation method and apparatus. For the problem of a low identification rate of a two-dimensional code image into which a background pattern and an artistic mode are fused, the at least one exemplary embodiment can obtain a structured two-dimensional code image by obtaining an initial two-dimensional code image and a background image and performing structured processing on the initial two-dimensional code image according to the background image, then perform mode transfer processing on the background image to obtain a background image of a target mode by a mode transfer model, and finally, perform a fusion operation on the structured two-dimensional code image and the background image of the target mode to obtain a target two-dimensional code image. As compared to the prior art, the at least one exemplary embodiment performs mode transfer processing only on the background image, which can avoid interference with pixels of the two-dimensional code image and thereby improve the identification rate of the subsequently generated target two-dimensional code image. Moreover, performing structured processing on the initial two-dimensional code image according to the background image may cause the pixel distribution of the subsequently generated target two-dimensional code image to more approach that of the background image, thereby causing the target two-dimensional code image to be better fused with the background image and causing the generated target two-dimensional code image to be more beautiful.

Further, according to the above exemplary method embodiments, another embodiment of the at least one exemplary embodiment further provides a storage medium on which are stored multiple instructions adapted for being loaded by a processor and performing the two-dimensional code image generation method as described above.

For the instructions in the two-dimensional code image generation storage medium provided by the at least one embodiment of the disclosure, the instructions can obtain a structured two-dimensional code image by obtaining an initial two-dimensional code image and a background image and performing structured processing on the initial two-dimensional code image according to the background image, wherein the structured processing fuses an image element of the background image on the premise of retaining the basic information of the initial two-dimensional code image; then perform mode transfer processing on the background image to obtain a background image of a target mode by a mode transfer model for converting an input image to an image of the target mode, which is established based on machine learning; and finally, perform a fusion operation on the structured two-dimensional code image and the background image of the target mode to obtain a target two-dimensional code image, such that the target two-dimensional code image not only has the basic information and the image element, but also has the target mode. As compared to the prior art, the at least one embodiment of the disclosure performs mode transfer processing only on the background image, which can avoid interference with pixels of the initial two-dimensional code image and thereby improve the identification rate of the subsequently generated target two-dimensional code image. Moreover, performing structured processing on the initial two-dimensional code image according to the background image may cause the pixel distribution of the subsequently generated target two-dimensional code image to more approach that of the background image, thereby causing the target two-dimensional code image to be better fused with the background image and causing the generated target two-dimensional code image to be more beautiful.

Further, according to the above method exemplary embodiments, another embodiment of the at least one exemplary embodiment further provides an electronic device comprising a storage medium and a processor; and the storage medium is adapted for storing instructions adapted for being loaded by the processor and performing the two-dimensional code image generation method as described above.

The two-dimensional code image electronic device provided by the at least one exemplary embodiment can obtain a structured two-dimensional code image by obtaining an initial two-dimensional code image and a background image and performing structured processing on the initial two-dimensional code image according to the background image, wherein the structured processing fuses an image element of the background image on the premise of retaining the basic information of the initial two-dimensional code image; then perform mode transfer processing on the background image to obtain a background image of a target mode by a mode transfer model for converting an input image to an image of the target mode, which is established based on machine learning; and finally, perform a fusion operation on the structured two-dimensional code image and the background image of the target mode to obtain a target two-dimensional code image, such that the target two-dimensional code image not only has the basic information and the image element, but also has the target mode. As compared to the prior art, the at least one exemplary embodiment performs mode transfer processing only on the background image, which can avoid interference with pixels of the initial two-dimensional code image and thereby improve the identification rate of the subsequently generated target two-dimensional code image. Moreover, performing structured processing on the initial two-dimensional code image according to the background image may cause the pixel distribution of the subsequently generated target two-dimensional code image to more approach that of the background image, thereby causing the target two-dimensional code image to be better fused with the background image and causing the generated target two-dimensional code image to be more beautiful.

In the above exemplary embodiments, the description of an individual embodiment has its own emphasis, and the part in a certain exemplary embodiment which is not described in detail may refer to related description of other embodiments.

It may be clearly understood by the person having ordinary skills in the art that, for the convenience and brevity of description, specific working procedures of the above-described system, apparatus and processor may refer to a corresponding procedure of the method embodiments, which will not be repeated here any longer.

The algorithms and displays provided here are not inherently related to any specific computer, virtual system or other devices. Various general-purpose systems may also be used with the teachings herein. According to the above description, the structure required for constructing such systems is obvious. In addition, at least one embodiment of the disclosure is not directed to any specific programming language. It should be understood that the content of at least one embodiment of the disclosure described herein may be carried out utilizing various programming languages, and that the above description for a specific language is for the sake of disclosing preferred implementations of at least one embodiment of the disclosure.

In the specification provided herein, a plenty of particular details are described. However, it can be appreciated that at least one embodiment may be practiced without these particular details. In some instances, well known methods, structures and technologies are not illustrated in detail so as not to obscure the understanding of the specification.

It may be appreciated by the person having ordinary skills in the art that modules in a device in an embodiment may be changed adaptively and arranged in one or more device different from the exemplary embodiment. Modules or processors or assemblies may be combined into one module or processor or assembly, and additionally, they may be divided into multiple sub-modules or sub-processors or subassemblies. Except that at least some of such features and/or procedures or processors are mutually exclusive, all the features disclosed in the specification (comprising the accompanying claims, abstract and drawings) and all the procedures or processors of any method or device disclosed as such may be combined employing any combination. Unless explicitly stated otherwise, each feature disclosed in the specification (comprising the accompanying claims, abstract and drawings) may be replaced by an alternative feature providing an identical, equal or similar objective.

Embodiments of the individual components of at least one exemplary embodiment may be implemented in hardware, or in a software module running on one or more processors, or in a combination thereof. It will be appreciated by the person having ordinary skills in the art that, in practice, some or all of the functions of some or all of the components in a two-dimensional code image generation method and apparatus according to at least one embodiment of the disclosure may be realized using a microprocessor or a digital signal processor (DSP). At least one embodiment of the disclosure may also be implemented as a device or apparatus program (e.g., a computer program and a computer program product) for carrying out a part or all of the method as described herein. Such a program implementing at least one embodiment of the disclosure may be stored on a computer readable medium, or may be in the form of one or more signals. Such a signal may be obtained by downloading it from an Internet website, or provided on a carrier signal, or provided in any other form.

It is to be noted that the above exemplary embodiments illustrate rather than limit at least one embodiment, and the person having ordinary skills in the art may design alternative embodiments without departing the scope of the appended claims. In the claims, any reference sign placed between the parentheses shall not be construed as limiting to a claim. The word "comprise/include" does not exclude the presence of an element or a step not listed in a claim. The word "a" or "an" preceding an element does not exclude the presence of a plurality of such elements. At least one embodiment of the disclosure may be implemented by means of a hardware comprising several distinct elements and by means of a suitably programmed computer. In a unit claim enumerating several means, several of the means may be embodied by one and the same hardware item. Use of the words first, second, and third, etc. does not mean any ordering. Such words may be construed as naming.

What is claimed is:

1. A two-dimensional code image generation method, comprising:
   obtaining an initial two-dimensional code image and a background image, and performing structured processing on the initial two-dimensional code image according to the background image to obtain a structured two-dimensional code image, wherein the structured processing is to fuse an image element of the background image on the premise of retaining the basic information of the initial two-dimensional code image, wherein the performing structured processing on the initial two-dimensional code image according to the background image to obtain a structured two-dimensional code image comprises: performing preprocessing on the background image to transform it to a corresponding scattergram which is constituted by a pixel module composed of black pixels and a pixel module composed of white pixels and of which the image size is the same as that of the initial two-dimensional code image; identifying individual functional areas of the initial two-dimensional code image, determining an area in the individual functional areas where pixel change may be made, determining the amount of change of a pixel in the area where the pixel change may be made in comparison with the scattergram, and generating the structured two-dimensional code image after corresponding change;
   performing mode transfer processing on the background image to obtain a background image of a target mode by a mode transfer model for converting an input image to an image of the target mode; and
   performing a fusion operation on the structured two-dimensional code image and the background image of the target mode to obtain a target two-dimensional code image, such that the target two-dimensional code image not only has the basic information and the image element, but also has the target mode.

2. The method as claimed in claim 1, wherein the performing preprocessing on the background image to transform it to the corresponding scattergram comprises:
   processing the background image into a corresponding grayscale image and dividing the grayscale image into $(n/m)^2$ pixel modules of the size m×m, the pixel module being denoted as $_{sub}G_r$, r being the index of a current pixel module and its value range being $[1,(n/m)^2]$, wherein n is the size of the initial two-dimensional code image, m is the size of a unit black module or a unit white module of the initial two-dimensional code image, the initial two-dimensional code image is constituted by multiple unit black modules and unit white modules, performing binarization processing of $_{sub}G_r$ to obtain binarized modules, the scattergram comprises $(n/m)^2$ binarized modules, wherein $_{mod}G_r$ is a module after $_{sub}G_r$ is binarized:

$$_{mod}G_r = \text{round}\left\{\frac{\sum_{i,j}{_{sub}G_r(i,j) \cdot G_W(i,j)}}{255}\right\}$$

wherein round represents an operation of taking value to the nearest whole number, $G_W(i,j)$ is a weight of $_{sub}G_r$ at its pixel $(i,j)$, $1 \leq i, j \leq m$, $\Sigma_{i,j} G_W(i,j)=1$, and $G_W(i,j)$ satisfies the Gaussian distribution and is defined as follows:

$$G_W(i,j) = \frac{1}{2\pi\sigma^2} e^{-\frac{i^2+j^2}{2\sigma^2}}, \sigma = \frac{m-1}{6}$$

wherein σ represents the standard deviation of the Gaussian distribution.

3. The method as claimed in claim 2, wherein the structured processing comprises:
   fusing the binarized background image with the initial two-dimensional code image to obtain an intermediate two-dimensional code image by the following formula:

$$_{mod}Q_r^i = \begin{cases} _{mod}Q_r^s, & Q_r^s \in M \\ _{mod}G_r, & Q_r^s \notin M \end{cases}$$

wherein $Q^s$ is the initial two-dimensional code image, $Q^i$ is an intermediate two-dimensional code image, and M is an unchangeable part in the initial two-dimensional code image; and utilizing the following formula to obtain the structured two-dimensional code image, wherein when the value of the formula after arg min is minimal, what is obtained is a matrix of the structured two-dimensional code image, which is denoted by $S_c$:

$$\arg\min_{S_c} \sum_r \eta(r) \cdot f(_{mod}Q_r^b, _{mod}Q_r^j)$$

wherein $Q^b$ is the scattergram, $Q_r^b$ and $Q_r^i$ are the r-th modules with a corresponding position of the background image and the intermediate two-dimensional code image, respectively, $\eta(r)$ represents a visual weight of the r-th modules, and the definition of the function f is: $f(a,b)=2(a\odot b)-1$, wherein $\odot$ represents an inclusive OR operation, and $$\eta(r) = \sum_{i,j} \lambda_1 {_{sub}E_r(i,j)} + \lambda_2 {_{sub}S_r(i,j)}$$

wherein $\lambda_1$ and $\lambda_2$ are a weight of an edge and a weight of significance, respectively, $E_r$ is the edge, and $S_r$ is the significance.

4. The method as claimed in claim 3, further comprising:
modifying the bit value of an area of the intermediate two-dimensional code image where pixel change occurs accordingly:

$$B_{L(r)} = B_{L(r)} \oplus {_{mod}Q_r^i} \oplus {_{mod}Q_r^s}$$

wherein L(r) is the number of bits of the r-th module, B represents bit, ⊕ represents an exclusive OR operation, which outputs 1 when two variables are different and 0 when the two variables are the same.

5. The method as claimed in claim 1, wherein the performing a fusion operation on the structured two-dimensional code image and the background image of the target mode to obtain a target two-dimensional code image comprises:
dividing the structured two-dimensional code image into square modules with a side length m, wherein each of the square modules is completely constituted by black pixels or completely constituted by white pixels; for a module constituted by black pixels, replacing it with a black circle with a diameter m/2; for a module constituted by white pixels, replacing it with a white circle with a diameter m/2; and for a part outside the circle with the diameter m/2 in the module, replacing it with pixels of the background image of the target mode at a corresponding position;
wherein m is the size of a unit black module or a unit white module in the initial two-dimensional code image, and the two-dimensional code image is constituted by multiple unit black modules and unit white modules.

6. The method as claimed in claim 1, wherein the performing mode transfer processing on the background image to obtain the background image of the target mode comprises:
constructing the mode transfer model by a neural network algorithm;
obtaining background information from the background image and obtaining target mode information from an image of a target mode, the background information comprising feature information of the background image, and the target mode information containing feature information of the image of the target mode; and
transforming the background image into the background image of the target mode by the mode transfer model according to the background information and the target mode information.

7. The method as claimed in claim 6, wherein the mode transfer model comprises a compilation layer, a transformation layer and a decoding layer, the compilation layer is used for obtaining the background information from the background image and obtaining the target mode information from the image of the target mode, the transformation layer is used for performing normalization calculation to obtain the feature information of the background image of the target mode according to the background information and the target mode information, and the decoding layer is used for outputting the background image of the target mode based on the feature information of the background image of the target mode.

8. The method as claimed in claim 1, wherein the structured processing further comprises: upgrading a version of the initial two-dimensional code image.

9. A two-dimensional code image generation apparatus, wherein the apparatus comprises:
a first processor for obtaining an initial two-dimensional code image and a background image, and performing structured processing on the initial two-dimensional code image according to the background image to obtain a structured two-dimensional code image, wherein the structured processing is to fuse an image element of the background image on the premise of retaining the basic information of the initial two-dimensional code image, wherein the first processor comprises: a transformation sub-processor for performing preprocessing on the background image to transform it to a corresponding scattergram which is constituted by a pixel module composed of black pixels and a pixel module composed of white pixels and of which the image size is the same as that of the initial two-dimensional code image; a structured two-dimensional code image generation sub-processor for identifying individual functional areas of the initial two-dimensional code image, determining an area in the individual functional areas where pixel change may be made, determining the amount of change of a pixel in the area where the pixel change may be made in comparison with the scattergram, and generating the structured two-dimensional code image after corresponding change;
a second processor for performing mode transfer processing on the background image to obtain an background image of a target mode by a mode transfer model for converting an input image to an image of the target mode; and
a fusion processor for performing a fusion operation on the structured two-dimensional code image and the background image of the target mode to obtain a target two-dimensional code image, such that the target two-dimensional code image not only has the basic information and the image element, but also has the target mode.

10. The apparatus as claimed in claim 9, wherein the second processor comprises:
a construction sub-processor for constructing the mode transfer model by a neural network algorithm;
an obtaining sub-processor for obtaining background information from the background image and obtaining target mode information from an image of a target mode, the background information comprising feature information of the background image, and the target mode information containing feature information of the image of the target mode; and
a transformation sub-processor for transforming the background image into the background image of the target mode by the mode transfer model according to the background information and the target mode information.

11. The apparatus as claimed in claim 10, wherein the mode transfer model comprises a compilation layer, a transformation layer and a decoding layer, the compilation layer is used for obtaining the background information from the background image and obtaining the target mode information from the image of the target mode, the transformation layer is used for performing normalization calculation to obtain the feature information of the background image of the target mode according to the background information and the target mode information, and the decoding layer is used for outputting the background image of the target mode based on the feature information of the background image of the target mode.

12. A storage medium, wherein on the storage medium are stored multiple instructions for being loaded by a processor and performing the two-dimensional code image generation method as claimed in claim 1.

13. An electronic device, wherein the electronic device comprises a storage medium and a processor; and the storage medium is used for storing instructions for being loaded by the processor and performing the two-dimensional code image generation method as claimed in claim 1.

14. The electronic device of claim 13, wherein the performing structured processing on the initial two-dimensional code image according to the background image to obtain a structured two-dimensional code image comprises:
performing preprocessing on the background image to transform it to a corresponding scattergram which is constituted by a pixel module composed of black pixels and a pixel module composed of white pixels and of which the image size is the same as that of the initial two-dimensional code image;
identifying individual functional areas of the initial two-dimensional code image, determining an area in the individual functional areas where pixel change may be made, determining the amount of change of a pixel in the area where the pixel change may be made in comparison with the scattergram, and generating the structured two-dimensional code image after corresponding change.

15. The electronic device of claim 14, wherein the performing preprocessing on the background image to transform it to the corresponding scattergram comprises:
processing the background image into a corresponding grayscale image and dividing the grayscale image into $(n/m)^2$ pixel modules of the size m×m, the pixel module being denoted as $_{sub}G_r$, r being the index of a current pixel module and its value range being $[1,(n/m)^2]$, wherein n is the size of the initial two-dimensional code image, m is the size of a unit black module or a unit white module of the initial two-dimensional code image, the initial two-dimensional code image is constituted by multiple unit black modules and unit white modules, performing binarization processing of $_{sub}G_r$ to obtain binarized modules, the scattergram comprises $(n/m)^2$ binarized modules, wherein $_{mod}G_r$ is a module after $_{sub}G_r$ is binarized:

$$_{mod}G_r = \text{round}\left\{\frac{\sum_{i,j} {_{sub}G_r(i,j)} \cdot G_W(i,j)}{255}\right\}$$

wherein round represents an operation of taking value to the nearest whole number, $G_W(i,j)$ is a weight of $_{sub}G_r$ at its pixel $(i,j)$, $1=<i, j<=m$, $\Sigma_{i,j} G_W(i,j)=1$, and $G_W(i,j)$ satisfies the Gaussian distribution and is defined as follows:

$$G_W(i,j) = \frac{1}{2\pi\sigma^2} e^{-\frac{i^2+j^2}{2\sigma^2}}, \sigma = \frac{m-1}{6}$$

wherein σ represents the standard deviation of the Gaussian distribution.

16. The electronic device of claim 15, wherein the structured processing comprises:
fusing the binarized background image with the initial two-dimensional code image to obtain an intermediate two-dimensional code image by the following formula:

$$_{mod}Q_r^i = \begin{cases} _{mod}Q_r^s, & Q_r^s \in M \\ _{mod}G_r, & Q_r^s \notin M \end{cases}$$

wherein $Q^s$ is the initial two-dimensional code image, $Q^i$ is an intermediate two-dimensional code image, and M is an unchangeable part in the initial two-dimensional code image; and
utilizing the following formula to obtain the structured two-dimensional code image, wherein when the value of the formula after arg min is minimal, what is obtained is a matrix of the structured two-dimensional code image, which is denoted by $S_c$:

$$\arg\min_{S_c} \sum_r \eta(r) \cdot f(_{mod}Q_r^b, {_{mod}Q_r^i})$$

wherein $Q^b$ is the scattergram, $Q_r^b$ and $Q_r^i$ are the r-th modules with a corresponding position of the background image and the intermediate two-dimensional code image, respectively, η(r) represents a visual weight of the r-th modules, and the definition of the function f is: $f(a,b)=2(a\odot b)-1$, wherein ⊙ represents an inclusive OR operation, and $$\eta(r) = \sum_{i,j} \lambda_1 {_{sub}E_r(i,j)} + \lambda_2 {_{sub}S_r(i,j)}$$

wherein $\lambda_1$ and $\lambda_2$ are a weight of an edge and a weight of significance, respectively, $E_r$ is the edge, and $S_r$ is the significance.

17. The electronic device of claim 16, wherein the two-dimensional code image generation method further comprises:
modifying the bit value of an area of the intermediate two-dimensional code image where pixel change occurs accordingly:

$$B_{L(r)} = B_{L(r)} \oplus {_{mod}Q_r^i} \oplus {_{mod}Q_r^s}$$

wherein L(r) is the number of bits of the r-th module, B represents bit, ⊕ represents an exclusive OR operation, which outputs 1 when two variables are different and 0 when the two variables are the same.

18. The electronic device of claim 13, wherein the performing a fusion operation on the structured two-dimensional code image and the background image of the target mode to obtain a target two-dimensional code image comprises:
dividing the structured two-dimensional code image into square modules with a side length m, wherein each of the square modules is completely constituted by black pixels or completely constituted by white pixels; for a module constituted by black pixels, replacing it with a black circle with a diameter m/2; for a module constituted by white pixels, replacing it with a white circle with a diameter m/2; and for a part outside the circle with the diameter m/2 in the module, replacing it with pixels of the background image of the target mode at a corresponding position;
wherein m is the size of a unit black module or a unit white module in the initial two-dimensional code image, and the two-dimensional code image is constituted by multiple unit black modules and unit white modules.

* * * * *